March 4, 1958
F. W. OLDENBURG
2,825,888
TURN SIGNAL FOR VEHICLE BODIES
Filed Oct. 26, 1956
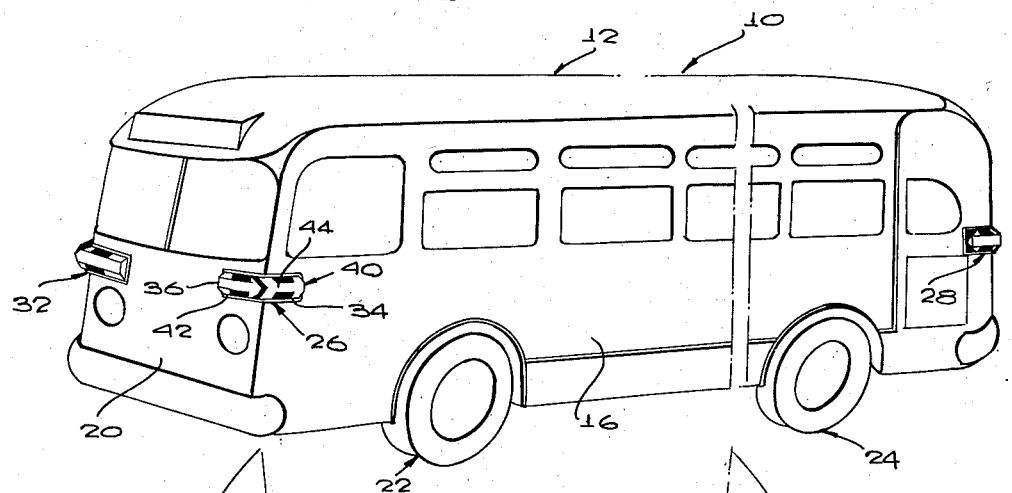
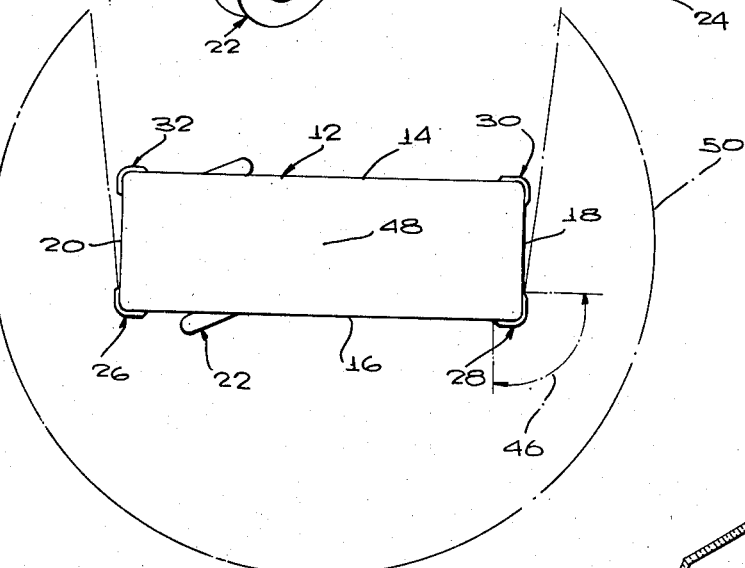
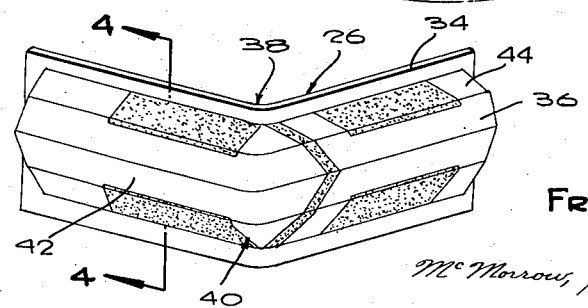
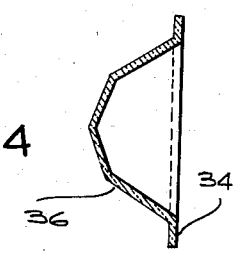
INVENTOR.
FREDERICK W. OLDENBURG
BY
McMorrow, Berman & Davidson
ATTORNEYS United States Patent Office 2,825,888
Patented Mar. 4, 1958

2,825,888
TURN SIGNAL FOR VEHICLE BODIES
Frederick W. Oldenburg, Harper Woods, Mich.
Application October 26, 1956, Serial No. 618,513
2 Claims. (Cl. 340—87)

This invention relates generally to signals and is more particularly concerned with a signal for vehicle bodies of the "turn indicator" type.

The continuing prominence of long wheel base vehicles such as trucks or buses, for example, has created a problem wherein individuals located in automobiles adjacent the sides of such vehicles or pedestrians are not readily apprised of the direction toward which a turn is to be negotiated inasmuch as due to the exceedingly long wheel base if such a vehicle is to make a right turn, for example, it must pull out a substantial distance from the right hand curb in order that the rear end of the vehicle misses the curb, for example, of a corner about which the turn is being negotiated. When a long wheel base vehicle is located a substantial distance from the right hand curb of a street, for example, passenger vehicles, for example, disposed between the adjacent side of such vehicles and the curb potentially will collide with the adjacent side of the vehicle when a turn is made if not readily apprised of such a turn. Present day "turn indicators" are normally disposed on the front and rear end of buses, for example, adjacent the intersection thereof with the sides of the vehicle body and accordingly are not visible to persons located adjacent such sides.

A primary object of invention in conformance with that set forth is to provide a signal disposed at the intersection of a side and end wall of a vehicle body not only apprising individuals located adjacent the end wall of the vehicle body of the direction toward which a turn is to be negotiated but also apprising individuals located adjacent the side thereof of the direction of such turns.

Another object of invention in conformance with that set forth is to provide signal assemblies incorporated in spaced side walls and spaced intersecting end walls at the intersections of such walls.

A further object of invention in conformance with that set forth is to provide signals of the "turn indicator" type which are readily and economically manufactured, easily applied, and highly safe, satisfactory and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a perspective view of a vehicle body having disposed thereon the signal assemblies of the invention;

Figure 2 is a diagrammatic top plan view of a vehicle body showing by means of arcuate phantom lines the arc of vision about an individual signal assembly on the vehicle body, and further showing the arc of vision relative to the center of the vehicle about which individuals will be visually apprised of a direction of turn to be made when the signal assemblies on one side of the vehicle body are lit;

Figure 3 is an enlarged perspective view of one of the signal assemblies; and

Figure 4 is a section taken substantially on the plane of line 4—4 of Figure 3.

Referring to the drawing in detail, indicated generally at 10 is a vehicle of the "bus type" incorporating a substantially rectangular body 12 including spaced side walls 14 and 16 intersecting spaced end walls 18 and 20 at their opposite ends. The end wall 18 identifies the rear end of the vehicle and the wall 20 identifies the forward end of the vehicle. Suitably supported in spaced relationship from the chassis of the vehicle are front and rear wheel assemblies indicated generally at 22 and 24, respectively. Overlying the corners or intersection of the side walls 14 and 16 with the end walls 18 and 20 are signal assemblies indicated generally at 26, 28, 30 and 32.

Each of the signal assemblies 26 through 32 includes a support frame 34 having suitably mounted therein a lens 36, said support frame being suitably secured in any suitable manner over a suitably conformed recess in the vehicle body at the intersection of the aforementioned end walls, although not shown, as is conventional the recess will contain therein an incandescent light assembly operatively connected to a suitable operator controlled circuit from within the vehicle body, said incandescent light assembly being of the constant or intermittently operating type when activated. When negotiating a turn to the left, for example, the signal assemblies 26 and 28 will be activated, and during a right hand turn signal assemblies 30 and 32 will be activated.

The frame 34 and lens 36 incorporate an intermediate angular-bend portion indicated generally at 38 conforming said frame and lens to the intersections of the end and side walls. The lens 36 of the various signal assemblies incorporates thereon a direction indicating indicia 40 including a first turn arrow 42 which will be disposed on the end of the vehicle body and a second turn arrow 44 disposed on the side of the vehicle, said indicia portion 40 substantially overlying the intersection of the end and side walls. It is to be noted that the turn arrows 42 and 44 extend in the same direction and also are in lineal alignment.

An individual disposed adjacent the front wall 20, for example, will be readily apprised of the direction toward which a turn is to be negotiated, and individuals located adjacent the side 16, for example, will simultaneously be apprised of said direction toward which a turn is to be negotiated.

As indicated diagrammatically in Figure 2, each signal assembly 28, for example, will in itself emit rays of light through said signal assembly 28 about an arc of substantially 270 degrees as indicated by the direction arrow 46. Furthermore, referring to the imaginary center 48 of the vehicle body, individuals located about an arc of substantially 270 degrees as indicated at 50 will be visually apprised that the signal assemblies 26 and 28 are activated and that a left hand turn is about to be negotiated.

Obviously, a passenger vehicle, for example, disposed adjacent the side 16 of the vehicle body 12 and an adjacent curb may readily observe the activated signal assemblies 26 and 28 being apprised that a left hand turn is going to be made and accordingly will not continue forward and collide with said side 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and

What is claimed as new is as follows:

1. For use on a vehicle body including intersecting side and end walls, a signal light assembly including a support frame having an angular bend in the intermediate portion, and a lens extending about and projecting outwardly from said frame, said frame being adapted to be fixedly positioned so that the part of said frame remote from said lens and on one side of the bend abuts against the end wall of said intersecting side and end walls, and the part of said frame remote from said lens and on the other side of the bend abuts against the side wall of said intersecting side and end walls with the part of the bend remote from said lens abutting against the intersection area of said intersecting side and end walls, the portions of said lens complemental to the parts of said frame on opposite sides of said bend each carrying a turn arrow, the turn arrows extending in the same direction.

2. The signal light assembly acording to claim 1 wherein the turn arrows are also in lineal alignment.

References Cited in the file of this patent

UNITED STATES PATENTS

| | | |
|---|---|---|
| 1,717,629 | Sawyer | June 18, 1929 |
| 1,987,013 | Koenig | Jan. 8, 1935 |

FOREIGN PATENTS

| | | |
|---|---|---|
| 431,732 | Germany | Nov. 22, 1925 |